Figure 1:
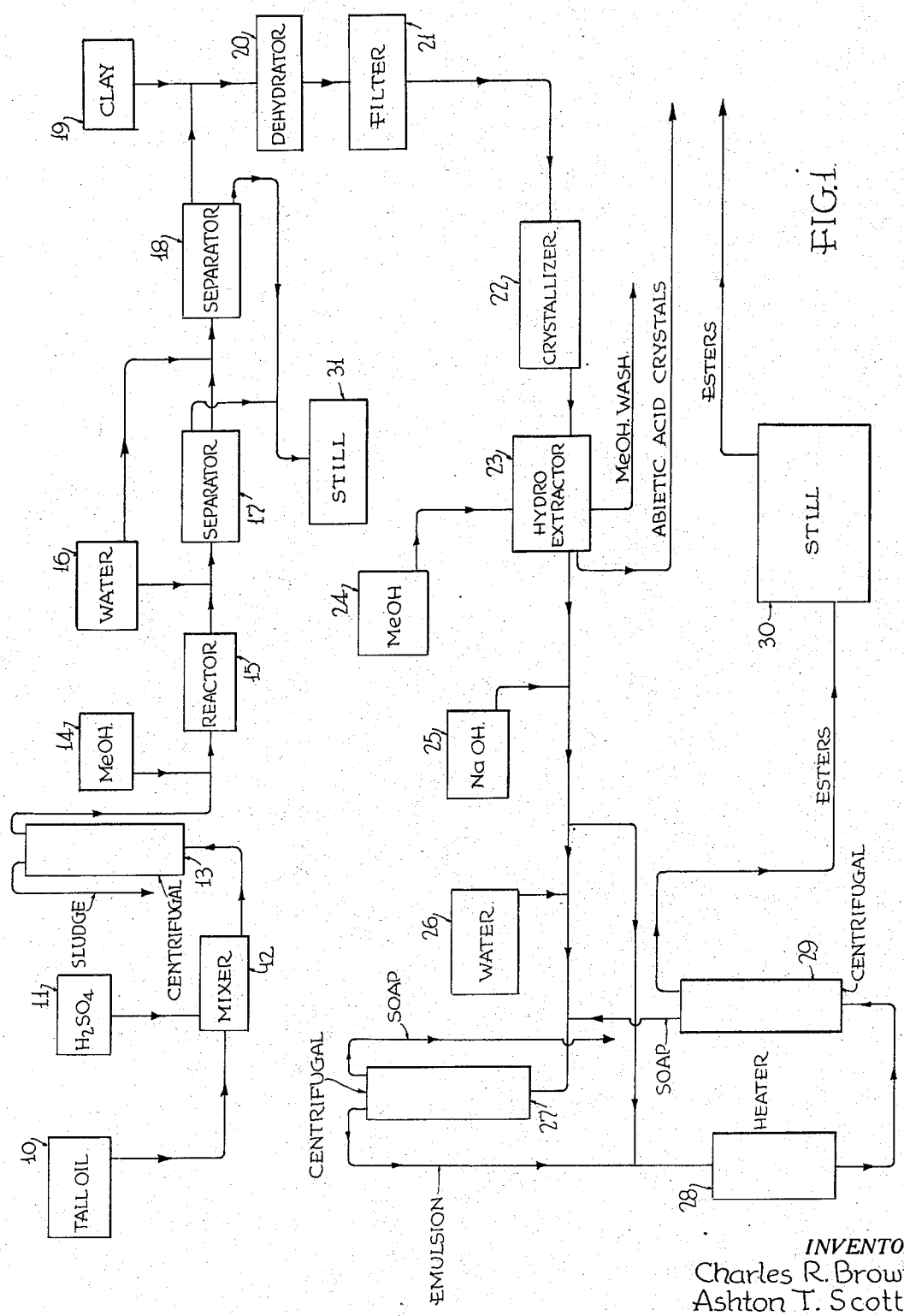

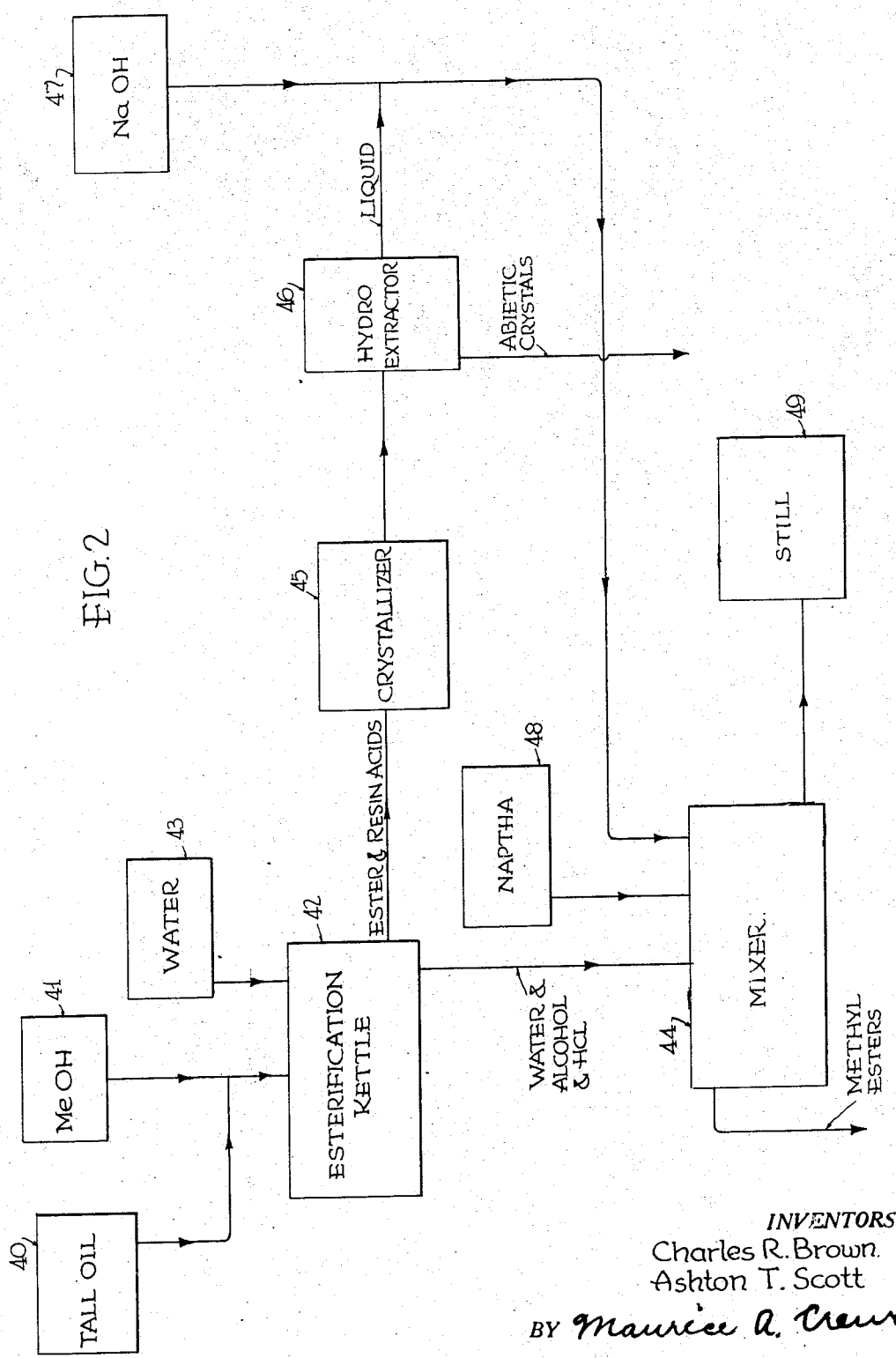

Patented Sept. 1, 1942

2,294,446

UNITED STATES PATENT OFFICE 2,294,446

TREATMENT OF TALL OIL ACIDS

Charles R. Brown, Upper Darby, and Ashton T. Scott, Ardmore, Pa., assignors to The Sharples Corporation, Philadelphia, Pa., a corporation of Delaware Application June 12, 1940, Serial No. 340,026

10 Claims. (Cl. 260—97.5)

The present invention pertains to treatment of mixtures of fatty acids and resin acids obtained from natural sources, in order to separate these acids from each other and from other constituents with which they may be admixed. It pertains more particularly to mixtures of these acids obtained from the treatment of black liquor in the sulphate paper manufacturing process. The mixture known as "tall oil" represents a familiar example of such a composition. In the practice of the present invention, the tall oil which is treated to effect separation of acid constituents and recovery of the respective acid values may be obtained by the processes described in our copending applications Serial No. 239,114 and/or 306,460, or it may be tall oil from any other suitable source. Mixtures of the fatty and resin acids with each other which are analogous to the tall oil of commerce will be hereinafter referred to in the specification and claims as "tall oil" and it will be understood that this term is used to designate such mixtures regardless of origin, and regardless of whether they may be designated as tall oil in the strict parlance of commerce.

Many proposals have been made in the past for solving the problem of separating tall oil acids from each other and from other tall oil constituents, such as phytosterol. Among the methods proposed for solution of this problem, the most effective have involved vacuum distillation, or selective esterification followed by solvent extraction. The method of vacuum distillation is objectionable because of the fact that the yields from such a process are relatively poor, since the high temperatures required for the distillation step even at low pressures cause much of the abietic acid to be decomposed to form abietic anhydride. The process of selective esterification, when carefully conducted, avoids this disadvantage, but this process, as practiced in the past in conjunction with solvent extraction, has also been subject to certain serious disadvantages, in that the products obtained contain undesirable impurities, and that a good deal of expense is entailed in connection with the use and recovery of the large quantities of solvents required.

An object of the present invention has been to provide a process which would avoid the difficulty inherent in the distillation process, in that high yields of the desired products are obtained.

A further object has been to avoid the defects inherent in the solvent extraction process, in that products of improved purity are obtained, and that the extractants used in the practice of the present invention consist peferably only of water and materials formed in the practice of the process itself.

Further objects, and the manner in which they have been attained, will be evident from a reading of the following specification in the light of the attached flow sheet, in which, Figure 1 represents the preferred method of practicing the process of the invention, and Figure 2 represents an alternative embodiment of the invention.

Referring to the drawings by reference characters, the tall oil from container 10 may be mixed with a small quantity of a mineral acid such as sulphuric acid (e. g., 2% of 70% acid) from container 11, and the resulting mixture of tall oil and acid sludge may be passed from the mixer 12 to centrifugal 13. This centrifugal effects separation of acid sludge as the heavier phase, and of tall oil as the lighter phase, both of these materials being preferably continuously and separately discharged from the centrifugal.

The acid treating step is preferably conducted at a temperature which is not in excess of 100° F. High temperatures should be avoided throughout the practice of the process of the present invention, and of the preliminary steps by which the tall oil which enters into the practice of the invention is obtained, since temperatures in excess of 220° F. tend to cause decomposition of the product.

The steps of acid treating by thorough agitation in the mixer 12 and centrifugal separation of the sludge from the tall oil in the centrifugal 13 effect removal of oxidized resin acids and other impurities from the product, thereby preventing the formation of sludges in connection with the ensuing steps of selective esterification and separation of constituents from each other. The step of acid treating has the additional advantage that it effects formation of certain sulfonated products which are retained in the tall oil and act as catalysts in the esterifying step which follows. This simple step of acid treating thus fulfills the dual function of removing constituents which inhibit the efficient performance of subsequent steps of the process, and of forming compounds which act as catalysts and thus render the introduction of special catalysts unnecessary.

The effluent from the centrifugal 13 is next subjected to esterification with an organic alcohol, and the alcohol used in this esterification step is preferably one of the lower aliphatic alcohols, such as methanol. In the practice of the process, the oil discharged from the centrifugal 13 may be mixed with an equal volume of 99% methanol from container 14 and subjected to selective esterification with this methanol in the reactor 15 until the esterification of the fatty acids of the mixture is substantially completed. This may be accomplished, for example, by heating the mixture to be esterified in the reactor 15 to a temperature in the neighborhood of 148° F. for several hours.

In the preferred practice of the invention, no catalyst is added to the material being subjected to esterification, since the sulfonated products formed in the preceding acid treating step constitute all of the catalyst necessary. An additional catalyst, such as a mineral acid or other esterification catalyst, may be added to the material in the reactor 15 within the spirit of the invention, however. While the presence of such additional catalyst serves to speed up the reaction somewhat, it also introduces a special problem of catalyst recovery which is avoided by the use of the sulfonated products already in the oil as the catalyst. At the conclusion of the esterification reaction, the reaction mixture is subjected to a water washing step to effect removal of the unreacted esterifying alcohol. As illustrated in the flow sheet, water from container 16 is added to the reaction mixture in an amount which may involve use of one part of water for each two parts of alcohol which have entered the esterification reaction. The water, containing dissolved alcohol, is separated from the oil in the separator 17.

In case the esterifying alcohol is methyl alcohol and the esterification and water washing operations involve the relative proportions of materials discussed above, the solution of methyl alcohol and water will separate from the oil in the separator 17 as the upper layer, and the tall oil esterification mixture, containing the methyl esters of the fatty acids, the resin acids and other oily constituents will constitute the lower layer. This lower layer is preferably subjected to a second step of water washing to remove further methyl alcohol. This second step of water washing may involve addition to the oily layer of an amount of water equal to the amount added before separation in the separator 17. The water so added will dissolve the remainder of the alcohol in the oily effluent from the separator 17, and this solution of methyl alcohol will be removed as the heavier layer from the separator 18, while the lighter, oily layer, will then be mixed with clay from container 19, subjected to dehydration by blowing air or an inert gas through the oil, as indicated at 20, and passed through the filter 21 to remove the clay. These steps of clay filtration and dehydration serve to remove water remaining in the oil as the result of the water washing steps, and to remove other impurities which would tend to inhibit the efficient performance of the following crystallization step.

It will be noted that the aqueous alcoholic layer forms the lighter layer in the separator 17 when the operation of water washing is performed as described above, but that the aqueous alcoholic layer in the separator 18 constitutes the heavier layer. The reason for this fact is as follows. The methyl alcohol is of lower specific gravity than the tall oil mixture, but the water is of higher specific gravity than either the methyl alcohol or the tall oil mixture. When water is added in the proportions discussed above from container 16 to the material passing to the separator 17, the water does not constitute a sufficiently large proportion of the material passed to the separator 17 to render the solution of methyl alcohol and water heavier than tall oil. The major part of the methyl alcohol is removed from the tall oil in the separator 17, however, and when further water is added from container 16, prior to passing the tall oil to the separator 18, the water preponderates in the aqueous alcoholic solution in the separator 18 to such an extent as to render this aqueous alcoholic solution layer heavier than the oil layer.

The wash water, which contains the methyl alcohol removed from separators 17 and 18, is passed to a still 31, in which it may be subsequently distilled to recover methyl alcohol, or from which it may be used in the performance of subsequent steps of the process as will be apparent hereinafter.

The tall oil mixture, containing the fatty acid esters, resin acids, and other constituents, is passed from filter 21 to crystallizer 22. This mixture is cooled in the crystallizer 22 to a temperature sufficiently low to cause selective crystallization of a large part of the resin acids which it contains. This crystallization step may, for example, involve maintaining the mixture at a temperature of approximately 110° F. for a period of time between 24 and 48 hours, or until approximately 50% of the abietic acid of the mixture has been crystallized from solution.

The mixture from the crystallizer 22 is next subjected to a filtering or screening operation to remove the resin acid crystals. This may be accomplished by passing the mixture to a hydro-extractor 23 having a suitable filtering or screening surface through which the liquid is discharged, while retaining the solids or discharging them separately by continuous or intermittent operation, as will be well understood by those skilled in the art. The crystals in the hydro-extractor 23 may be washed with methyl alcohol from container 24 in order to remove esters or other impurities which are not desired in the abietic acid crystals. The methyl alcohol wash liquor from this purification step may be returned to the esterification step performed in the reactor 15, in order to recover values from this methyl alcohol wash water, and re-use the methyl alcohol. The washed crystals from the hydro-extractor 23 will be found to be relatively pure abietic acid.

The oily mixture discharged from the hydro-extractor 23, containing the methyl esters of the fatty acids, the portion of the resin acids which were not crystallized in crystallizer 22, and other constituents including phytosterol, is next mixed with a sufficient quantity of a base to form water soluble soaps by reaction of the base with the acid constituents of the mixture. This is accomplished by adding a base capable of forming water soluble soaps, such as an alkali metal or ammonium hydroxide, from container 25 and mixing this added base with the oil. The step of neutralization may be accomplished, for example, by adding a sufficient quantity of sodium hydroxide of 20 to 25% concentration.

The mixture resulting from addition of sodium hydroxide from the container 25 will contain soaps, esters, and unsaponifiable constituents such as phytosterol. It is desirable, in the practice of the invention, to make a relatively clean separation of each of these constituents from each of the others. In the practice of the invention, this is accomplished without the addition of any expensive solvent. The mixture is first diluted with an amount of water from container 26 which may be between 3 and 4 times the volume of material under treatment. The addition of this water thins the soap of the mixture to a relatively dilute condition, and this thin soap is separated as the heavier phase from a continuous centrifugal separator 27. The centrifugal separating operation performed in centrifugal 27 is preferably accomplished at a relatively high temperature; e. g., between 200 and 210° F.

The lighter phase of the centrifugation consists of an emulsion containing esters, unsaponifiable constituents, and some soap. This mixture is diluted with a substantial quantity of the mixture resulting from neutralization of the oil effluent from hydro-extractor 23 by the base from container 25, and is heated to a temperature sufficiently high to break the emulsion, this heating step being preferably performed by passing the materials through a heater 28 to heat the mixture to a temperature between 200 and 210° F.

The broken emulsion from the heater 28 is passed to a second centrifugal 29 of the same type as centrifugal 27, and the emulsion is separated in that machine into a relatively thick soap, which is the heavy effluent, and an ester-containing fraction which is almost completely free from soap, this ester-containing fraction also containing unsaponifiable constituents of the crude starting material. The esters from the centrifugal 29 are passed to still 30, where they are subjected to vacuum distillation and passed overhead, leaving unsaponifiable material as residue. The esters removed from the still 30 may be subjected to saponification with an alkali such as caustic soda and sprung with an acid, in order to recover the fatty acids of the esters as such, if the fatty acids are the ultimately desired product rather than the esters of these acids. The soap discharged from centrifugal 29 is preferably mixed with the material being passed to the centrifugal 27. The thin soap from centrifugal 27 may be sprung with a mineral acid, and the resulting resin acids may be subjected to dehydration and crystallization steps such as those described with respect to material leaving the separator 18. Alternatively, these resin acids may be mixed with tall oil in the container 10 or with the liquid effluent from the separator 18, along with other materials being processed in the practice of the invention.

In the practical performance of the two-stage centrifugal separating step discussed above, best results have been obtained by dividing the soap-containing material, obtained by adding sodium hydroxide from container 25, into two approximately equal parts. The first such part is diluted with water and centrifuged, as discussed in connection with elements 26 and 27 of the flow sheet. The second part is mixed with the oily effluent from centrifugal 27 as discussed above, and passed through the heater 28 and the centrifugal 29, the soap effluent from the centrifugal 29 being mixed with the thin soap-containing mixture passing to the centrifugal 27, as indicated on the flow sheet.

While we do not wish to be limited as to any theory for the results obtained in the practice of the invention, it is believed that a discussion of the theory underlying the steps performed by the elements 25 to 29 of the flow sheet will be helpful in enabling those skilled in the art to practice the invention. The soap formed by addition of sodium hydroxide from container 25 is principally sodium abietate. This soap, in its concentrated form, possesses a certain degree of solvent power for the methyl esters of the mixture and for certain of the unsaponifiable constituents. It is therefore necessary to dilute the soap with water from container 26 in order to precipitate part of the oil values of the mixture from solution in the soap. But when a mixture containing the quantity of water necessary to effect such precipitation is subjected to centrifugation in the centrifugal 27, it is impossible to effect a clean-cut separation of soap from other constituents of the mixture. While a thin soap which contains very little of the methyl esters or unsaponifiable constituents may be discharged from the centrifugal 27, the lighter phase from this centrifugal will necessarily contain some soap and water, with the result that a considerable degree of emulsification of the constituents of this effluent exists.

When the emulsion effluent from the centrifugal 27 is mixed with a substantial quantity of the thick soap-containing mass resulting from addition of sodium hydroxide from container 25, this thick soap-containing mass absorbs the excess water present in the emulsion phase, and the resulting mixture can be subjected to successful centrifugation as indicated at 29, provided it is passed to that centrifugal at a temperature sufficiently high to insure breaking of the emulsion. The soap effluent from the centrifugal 29 is relatively concentrated, and by reason of its concentration it contains a certain amount of the methyl esters in solution. The lighter effluent from the centrifugal 29, on the other hand, is substantially free of soap. The addition of the heavy soap to the emulsion discharged from the centrifugal 27 thus has the rather surprising effect in net result of assisting in removing the relatively small quantity of soap which is in that emulsion prior to addition of this heavy soap.

From the above discussion, it will be evident that it is desirable to adjust the centrifugal 29 in such a manner as to obtain a light, ester phase, effluent which is relatively free of the soap phase. On the other hand, it is desirable that the centrifugal 27 be adjusted in such a way as to produce a soap phase which is relatively free of the ester and unsaponifiable constituent phase. The efficiency of the operation is not greatly impaired by reason of the discharge of a certain amount of soap with the emulsion phase from the centrifugal 27 or because of the fact that part of the esters and unsaponifiable constituents may be discharged from the centrifugal 29 with the soap phase. The presence of a certain amount of esters and unsaponifiable constituents in the soap effluent from the centrifugal 29 is inevitable in any case, since the soap, in the concentration involved, has some solvent power for these constituents. It is to be noted, however, that this soap is passed into contact with a very much more dilute soap, and is subjected to efficient centrifugation in the centrifugal 27 to recover esters and unsaponifiable constituents therefrom. Similarly, the emulsion phase discharged from the centrifugal 27 is subjected to mixing with concentrated soap, heating, and a further step of centrifugation, in order that the soap and water may be removed with reasonable thoroughness from this emulsion phase. The functions of the centrifugals 27 and 29 are thus, in a sense, opposite, it being the function of the centrifugal 27 to remove practically all of the esters and unsaponifiable constituents from the soap, and the function of the centrifugal 29 to remove practically all of the soap and water from the esters. In connection with each centrifugal, the job of cleaning up the impure effluent is passed on to the other centrifugal.

A great many modifications are possible within the spirit of the invention. Thus, instead of using relatively pure water from the container 26 to dilute the viscous soap-containing mass before passing this material to the centrifugal 27, part or all of the alcohol-containing wash water from the still 31, resulting from washing the original esterification mixture, may be used to effect this dilution. We prefer, however, to use relatively pure water in this step of dilution, since this simplifies the subsequent purification steps. As a further alternative, the emulsion effluent from the centrifugal 27 may be separated into its constituents by a solvent extraction step to effect separation of water and soap from the organic constituents, instead of treating this emulsion with a further quantity of soap, as described in connection with the elements 28 and 29 of the flow sheet.

The steps of clay treating, dehydrating, crystallizing abietic acid and removing the crystallized product from the esterified mixture may be entirely omitted within the spirit of the invention, although these features are very useful. It would be possible to subject the oily mixture passing from the separator 18 directly to treatment with a base, and practice the features of the invention following such treatment and described in connection with flow sheet numerals 25 to 30, within the broad spirit of the invention. The steps of clay treating, dehydration and crystallization of abietic acid have value because of the fact that they reduce the amount of soap formed in the subsequent steps of the process, and thus reduce the extent of the processing operations, but the invention could be practiced without removing any part of the abietic acid prior to the steps of treatment with a base, treatment with water and successive steps of centrifugation as described.

It is possible to employ many other features than those described in the practice of the invention, or to adopt still further modifications of the invention, other than those described. Thus, for example, the crude tall oil may be diluted with a light hydrocarbon such as naphtha in order to facilitate the acid treating step, and the diluent may be retained in the treated product during esterification, and even during subsequent steps of the process.

While we have described a process involving performance of a succession of water washing steps to remove esters and unsaponifiable constituents from the soap-containing mixture, it would be possible to effect a fair degree of separation of esters and unsaponifiable constituents in a single step of centrifugation. In case this operation is performed in a single step, it will usually be desirable to eliminate the addition of water to the soap-containing mass before passing this mass to the centrifugal 27, or at least to decrease the proportion of such water below the proportion indicated in connection with the preferred embodiment of the invention.

Figure 2 of the drawings represents a modification of the invention which is not considered to be as desirable as Figure 1, but which affords good results. In this embodiment, tall oil from container 40 is mixed with a lower aliphatic alcohol, such as methyl, ethyl or propyl alcohol from container 41, and these constituents are heated in esterification kettle 42 until substantially all of the fatty acids of the tall oil have been esterified. This esterification reaction may be catalyzed by sulfonic compounds remaining in the tall oil as the result of an acid treating step such as that described in connection with Figure 1, or a small amount of dry hydrochloric acid, or of sulfuric acid, may be used as the catalyst.

At the conclusion of the esterification reaction, the esterification mixture is washed with water from container 43, and the mixture of water, alcohol and catalyst resulting from this washing operation is passed to mixer 44. The mixture of ester and resin acids is passed to a crystallizer 45 (preferably after drying as in connection with Figure 1), and the crystallized abietic acid is removed from other constituents of the mixture in hydro-extractor 46, the crystallizing and hydro-extracting steps being similar to those performed in connection with Figure 1 of the flow sheet. The liquid from hydro-extractor 46 is mixed with saponifying reagent from container 47 to effect saponification of the remaining abietic acid as in connection with Figure 1 of the drawings, and the resulting soap-containing mass is then passed to mixer 44 and mixed with the aqueous effluent which has been passed to that mixer from the esterification kettle. After the soap is thoroughly mixed with the aqueous material in the mixer 44, the mixture is allowed to stand, and 70% of the esters of the soap-containing mass separate from the remaining material in the mixer as the lighter phase. These esters are drawn off from the mixture of soap, water, unsaponifiable constituents, etc. After removal of the majority of the esters as discussed above, the remaining material in the mixer 44 is mixed with an organic solvent to effect removal of the remaining esters and unsaponifiable constituents from the remaining soap and water. This treatment may be accomplished by adding a sufficient amount of naphtha from container 48 to dissolve the esters and unsaponifiable constituents, and the extracted constituents, together with the naphtha solvent, are then passed to a still 49, where the naphtha, esters and unsaponifiable constituents are separated from each other by distillation.

It will be noted that in this embodiment of the invention, as in the embodiment of Figure 1, we take advantage of the fact that the esters can be separated to a large extent from the soap with which they are contaminated, by subjecting the soap to treatment with an aqueous liquid. The embodiment of Figure 2 of the drawings differs fundamentally from that of Figure 1, however, in that the further separation of esters and unsaponifiable constituents is accomplished by an extracting step involving dual solvent action, in which the methyl alcohol dissolves the soap and water, and the naphtha dissolves the esters and unsaponifiable constituents.

Still further modifications will be obvious to those skilled in the art, and we do not therefore wish to be limited except by the scope of the following claims.

We claim:

1. In the treatment of a mixture of resin acids and fatty acid esters resulting from selective esterification of tall oil with a lower aliphatic alcohol, the steps comprising neutralizing said mixture by mixing therewith a base which forms water soluble soap with the acids of said mixture, thereafter adding water to the resulting soap-containing mixture to produce an aqueous soap phase and an ester phase immiscible with said aqueous soap phase, centrifuging said mixture to separate said phases from each other, mixing a further quantity of the original soap-containing mixture with said separated ester-phase and subjecting this final mixture to a second step of centrifugation to separate soap therefrom.

2. A process as defined in claim 1, in which the soap obtained from said last-mentioned step of centrifugation is mixed with further material passing to said first-mentioned step of centrifugation.

3. In the treatment of a mixture obtained by subjecting tall oil to selective esterification with a lower aliphatic alcohol to effect esterification of fatty acids to the substantial exclusion of resin acids, the process comprising selectively crystallizing a portion of the resin acid content of the mixture and removing the crystallized resin acids from the mixture, mixing the resulting mixture from which a part of the resin acids have been removed by selective crystallization with a base capable of forming water soluble soaps with the resin acid content of the mixture to form a mixture of the fatty acid esters with soap formed by neutralization of resin acids by said base, adjusting the water content of said mixture to produce an aqueous soap phase and an ester phase immiscible with said aqueous soap phase, and separating said phases from each other.

4. In the treatment of a mixture obtained by subjecting tall oil to selective esterification with a lower aliphatic alcohol to effect esterification of fatty acids to the substantial exclusion of resin acids, the process comprising selectively crystallizing a portion of the resin acid content of the mixture and removing the crystallized resin acids from the mixture, mixing the resulting mixture from which a part of the resin acids have been removed by selective crystallization with a base capable of forming water soluble soaps with the resin acid content of the mixture to form a mixture of the fatty acid esters with soap formed by neutralization of resin acids by said base, adjusting the water content of said mixture to produce an aqueous soap phase and an ester phase immiscible with said aqueous soap phase, and separating said phases from each other by centrifugation.

5. In the treatment of a mixture obtained by subjecting tall oil to selective esterification with a lower aliphatic alcohol to effect esterification of fatty acids to the substantial exclusion of resin acids, the process comprising selectively crystallizing a portion of the resin acid content of the mixture and removing the crystallized resin acids from the mixture, mixing the resulting mixture from which a part of the resin acids have been removed by selective crystallization with a base capable of forming water soluble soaps with the resin acid content of the mixture to form a mixture of the fatty acid esters with soap formed by neutralization of resin acids by said base, and thereafter separating said soap from said resin acids.

6. A process as defined in claim 5, in which the separation of soap is accomplished by adding water and a hydrocarbon solvent to the mixture resulting from addition of a base to the mixture of tall oil acids, and separating the resulting aqueous soap and ester phases from each other by subsidence.

7. In the treatment of a mixture obtained by subjecting tall oil to selective esterification with a lower aliphatic alcohol to effect esterification of fatty acids to the substantial exclusion of resin acids, the process comprising selectively crystallizing a portion of the resin acid content of the mixture and removing the crystallized resin acids from the mixture, mixing the resulting mixture from which a part of the resin acids have been removed by selective crystallization with a base capable of forming water soluble soaps with the resin acid content of the mixture to form a mixture of the fatty acid esters with soap formed by neutralization of resin acids by said base, adding water to a portion of the mixture of fatty acid esters with soap so obtained to produce an aqueous soap phase and an ester phase immiscible with said aqueous soap phase, separating said phases from each other, thereafter adding a second portion of the mixture of fatty acid esters with soap formed by neutralization of resin acids by said base to the ester phase separated from said aqueous soap phase, and separating the soap phase of the mixture produced by this last-mentioned step from the ester phase so produced.

8. In the treatment of a mixture obtained by subjecting tall oil to selective esterification with a lower aliphatic alcohol to effect esterification of fatty acids to the substantial exclusion of resin acids, the process comprising selectively crystallizing a portion of the resin acid content of the mixture and removing the crystallized resin acids from the mixture, mixing the resulting mixture from which a part of the resin acids have been removed by selective crystallization with a base capable of forming water soluble soaps with the resin acid content of the mixture to form a mixture of the fatty acid esters with soap formed by neutralization of resin acids by said base, adding water to a portion of the mixture of fatty acid esters with soap so obtained to produce an aqueous soap phase and an ester phase immiscible with said aqueous soap phase, separating said phases from each other by centrifugation, thereafter adding a second portion of the mixture of fatty acid esters with soap formed by neutralization of resin acids by said base to the ester phase separated from said aqueous soap phase, and separating by centrifugation the soap phase of the mixture produced by this last-mentioned step from the ester phase so produced.

9. In the treatment of a mixture of resin acids and fatty acid esters resulting from selective esterification of tall oil with a lower aliphatic alcohol, the steps comprising neutralizing said mixture by mixing therewith a base which forms water soluble soap with the acids of said mixture, thereafter adding water to the resulting soap-containing mixture to produce an aqueous soap phase and an ester phase immiscible with said aqueous soap phase, subjecting said mixture to subsidence separation to separate said phases from each other, mixing a further quantity of the original soap-containing mixture with said separated ester phase and subjecting this final mixture to a second step of subsidence separation to separate soap therefrom.

10. A process as defined in claim 9, in which the soap obtained from said last-mentioned step of subsidence separation is mixed with further material passing to said first-mentioned step of subsidence separation.

ASHTON T. SCOTT.
CHARLES R. BROWN.